United States Patent
Kataoka et al.

(10) Patent No.: US 10,232,456 B2
(45) Date of Patent: Mar. 19, 2019

(54) SOLDERING IRON

(71) Applicant: Taiyo Electric Ind. Co., Ltd., Fukuyama-shi, Hiroshima-ken (JP)

(72) Inventors: Eiichiro Kataoka, Fukuyama (JP); Tomohiro Shigekawa, Fukuyama (JP); Ikuko Fukuyama, Fukuyama (JP); TOmoko Nishimura, Fukuyama (JP); Kento Inoue, Fukuyama (JP)

(73) Assignee: Taiyo Electric Ind. Co., Ltd., Hiroshima-Ken (JP)

( * ) Notice: Subject to any disclaimer, the term of this patent is extended or adjusted under 35 U.S.C. 154(b) by 64 days.

(21) Appl. No.: 15/372,991

(22) Filed: Dec. 8, 2016

(65) Prior Publication Data

US 2017/0182577 A1 Jun. 29, 2017

(30) Foreign Application Priority Data

Dec. 28, 2015 (JP) ................................. 2015-256984

(51) Int. Cl.
*B23K 3/02* (2006.01)
*B23K 3/053* (2006.01)
(Continued)

(52) U.S. Cl.
CPC .............. *B23K 3/053* (2013.01); *B23K 3/033* (2013.01); *B23K 3/0307* (2013.01); *B23K 2101/36* (2018.08); *B23K 2101/42* (2018.08)

(58) Field of Classification Search
CPC ......................................... B23K 3/02–3/0392
(Continued)

(56) References Cited

U.S. PATENT DOCUMENTS 3,536,890 A * 10/1970 Hombrecher Friedrich ................ B23K 3/0338
219/229
4,055,744 A 10/1977 Fortune
(Continued)

FOREIGN PATENT DOCUMENTS

CN 1196654 A 10/1998
CN 1778508 A 5/2006
(Continued)

OTHER PUBLICATIONS

English translation of JP 2006-150365 to Shigekawa, published Jun. 15, 2006.*

(Continued)

*Primary Examiner* — Michael Laflame, Jr.
(74) *Attorney, Agent, or Firm* — Wood Herron & Evans LLP

(57) ABSTRACT

A soldering iron including an iron main body and an iron tip includes an iron tip main body having a hollow space inside extending along a longitudinal direction; an insulator tube in the hollow space; a heater wire to heat the iron tip main body, and a temperature sensor to detect a temperature of the leading end side of the iron tip, the heater wire includes: an outward route part extending towards a leading end of the iron tip, and a return route part extending towards a base end of the iron tip, while the heater wire folded back at a vicinity of the leading end of the iron tip being wound around the insulator tube, in the insulator tube, a heater wire hole to accommodate the return route part of the heater wire and a sensor wire hole to accommodate a sensor wire are formed independent of each other.

8 Claims, 7 Drawing Sheets

(51) Int. Cl.
 *B23K 3/03* (2006.01)
 *B23K 101/36* (2006.01)
 *B23K 101/42* (2006.01)

(58) Field of Classification Search
 USPC .................. 219/227, 229–239; 228/51–55
 See application file for complete search history.

(56) References Cited

U.S. PATENT DOCUMENTS

| | | | | |
|---|---|---|---|---|
| 4,648,545 A | * | 3/1987 | Polckemann | B23K 3/0615 |
| | | | | 219/230 |
| 4,940,178 A | * | 7/1990 | Hombrecher | B23K 3/026 |
| | | | | 219/238 |
| 5,122,637 A | * | 6/1992 | Bottorff | B23K 3/033 |
| | | | | 219/229 |
| 5,837,973 A | * | 11/1998 | Tamura | B23K 3/033 |
| | | | | 219/241 |
| 5,894,409 A | * | 4/1999 | Tanaka | G01G 19/08 |
| | | | | 174/254 |
| 6,054,678 A | * | 4/2000 | Miyazaki | B23K 3/033 |
| | | | | 219/229 |
| 6,831,252 B1 | * | 12/2004 | Crookshanks | B23K 3/0369 |
| | | | | 219/229 |
| 2003/0146264 A1 | * | 8/2003 | Miyazaki | B23K 3/027 |
| | | | | 228/51 |
| 2004/0206740 A1 | * | 10/2004 | Miyazaki | B23K 3/033 |
| | | | | 219/229 |
| 2006/0022018 A1 | * | 2/2006 | Yoshimura | B23K 3/0361 |
| | | | | 228/54 |
| 2006/0243851 A1 | * | 11/2006 | Ishii | B23K 3/06 |
| | | | | 242/557 |

FOREIGN PATENT DOCUMENTS

| | | |
|---|---|---|
| CN | 102554390 A | 7/2012 |
| JP | 2004017060 A | 1/2004 |
| JP | 2006150365 A | 6/2006 |

OTHER PUBLICATIONS

Chinese Patent Office, Office Action issued in Chinese Patent Application No. 201611195193.6 dated Aug. 3, 2018, 15 pages.

* cited by examiner

SOLDERING IRON

CROSS-REFERENCE TO RELATED APPLICATIONS

Priority is claimed on Japanese Patent Application No. 2015-256984, filed on Dec. 28, 2015, the contents of which are incorporated herein by reference.

BACKGROUND

Field of the Invention

The present invention relates to a soldering iron.

Background

In the related art, an iron tip of a soldering iron is known, in which an iron tip main body of a thermal conductive material with a hollow space extending along a longitudinal direction thereof is used, and a heater and a temperature sensor for a temperature control are built inside the iron tip main body (for example, refer to Japanese Patent Application, Publication No. 2004-17060).

Actually, in the recent surface mount technologies such as brazing extremely small LSIs or the like on a board, a portion for brazing and a portion not to be fused are disposed in an extremely small area. And in order to conduct such a brazing, a soldering iron provided with a diameter which is as small as possible is desired so that the iron tip is able to be precisely placed in the extremely small area. And in the related art, a configuration of a soldering iron of a small size is known (for example, refer to Japanese Patent Application, Publication 2006-150365).

SUMMARY

However, the soldering iron of the Japanese Patent Application, Publication 2006-150365 is configured to have a second cylindrical member for protecting a sensor wire of a temperature sensor inside a first cylindrical member for winding a heater wire around its outer circumferential surface. In a soldiering iron of a double tube configuration like this, drastic reduction of diameter of the iron tip is limited.

An aspect of the present invention provides a soldering iron which enables reduction of diameter of an iron tip in a simple configuration.

A soldering iron of the aspect of the present invention is a soldering iron including an iron main body and an iron tip having a leading end configured to fuse solder, the iron tip at least including an iron tip main body having a hollow space inside extending along a longitudinal direction; an insulator tube accommodated in the hollow space; a heater wire configured to heat the iron tip main body, and a temperature sensor configured to detect a temperature of the leading end side of the iron tip, wherein the heater wire includes: an outward route part extending towards the leading end of the iron tip, and a return route part extending towards a base end of the iron tip, while the heater wire folded back in the hollow space at a vicinity of the leading end of the iron tip being wound like a coil around an outer circumferential surface of the insulator tube, wherein, in the insulator tube, a heater wire hole configured to accommodate the return route part of the heater wire and a sensor wire hole configured to accommodate a sensor wire of the temperature sensor are formed independent of each other.

According to the soldering iron described above, the insulator tube of insulator in which the heater wire hole accommodating the outward route part of the heater wire, and the sensor wire hole accommodating the sensor wire of the temperature sensor is provided inside the iron tip main body. In this configuration, it is possible to simplify the configuration of the iron tip, compared to the double tube configuration of the cylindrical member for protecting a sensor wire of a temperature sensor and the cylindrical member for winding a heater wire around its outer circumferential surface.

In the soldering iron, the sensor wire hole may be a first sensor wire hole configured to accommodate a positive pole side sensor wire of the temperature sensor and a second sensor wire hole configured to accommodate a negative pole side sensor wire of the temperature sensor.

In the soldering iron, the insulator tube may include an insulator tube main body part, around the outer circumferential surface of which is wound the heater wire, and an insulator tube auxiliary part disposed adjacent to at least either one of one end side and the other end side of the insulator tube main body part, having a smaller cross sectional diameter (a smaller cross section, a smaller cross sectional area) than that of the insulator tube main body part and the sensor wire hole formed thereon.

In the soldering iron, an outer diameter of the iron tip main body may be less than 5 mm.

According to the aspect of the present invention, it is possible to provide a soldering iron which enables reduction of diameter of an iron tip in a simple configuration.

BRIEF DESCRIPTION OF THE REFERENCE NUMERALS

10 SOLDERING IRON
11 IRON TIP
12 IRON MAIN BODY
21 IRON TIP MAIN BODY
22 HEATING DEVICE
25 EXTERIOR BODY
31 INSULATOR TUBE
32 HEATER WIRE
33 TEMPERATURE SENSOR
35 SENSOR WIRE
41 HEATER WIRE HOLE
42 FIRST SENSOR WIRE HOLE
43 SECOND SENSOR WIRE HOLE

DESCRIPTION OF THE EMBODIMENTS

Hereinafter, a soldering iron according to embodiments of the aspect of the present invention is described with reference to the drawings. Description of specific embodiment below is made for better understanding of the aspect of the present invention, thus, does not limit the present invention, unless otherwise specified. There may be cases in which the drawings referred to in the description below shows magnified image of important portion for the purpose of convenience in terms of explaining features of the aspect of the present invention. Therefore, dimension ratio or the like of each elements are not always the same as actual elements.

Below, a soldering iron according to an embodiment of the aspect of the present invention is described.

(First embodiment)

Figure 1:
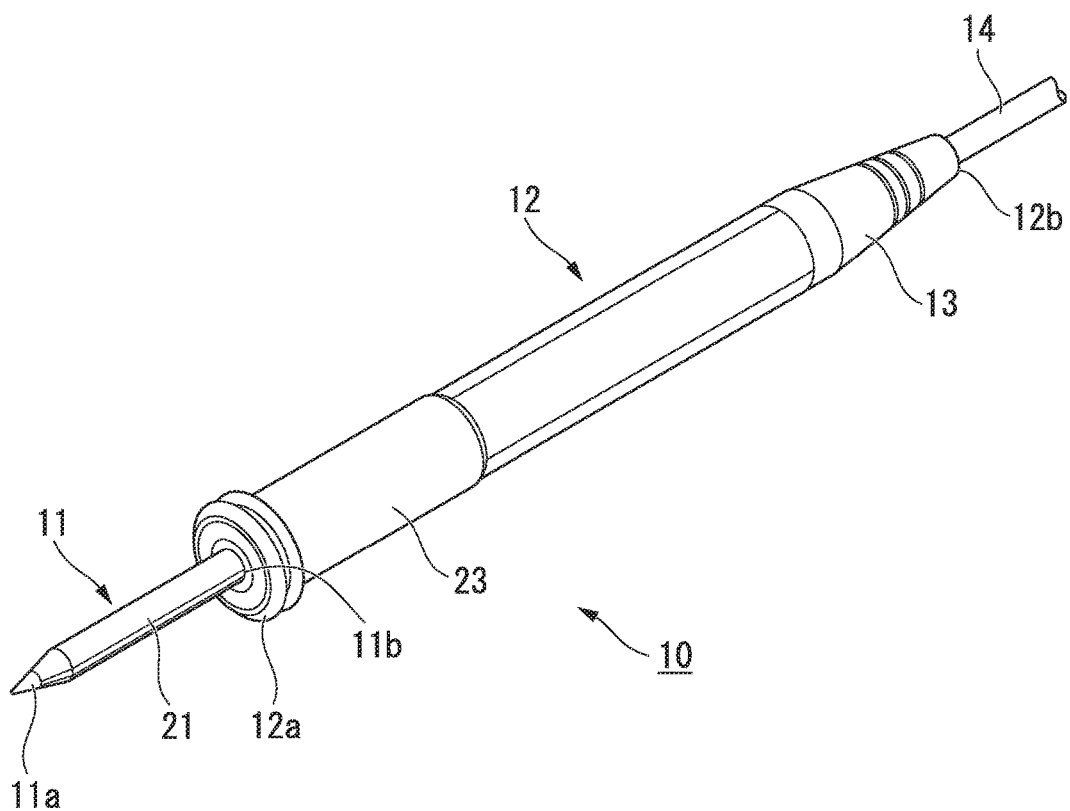
FIG. 1 is an external perspective view of a soldering iron according to a first embodiment of the aspect of the present invention.
Figure 2:
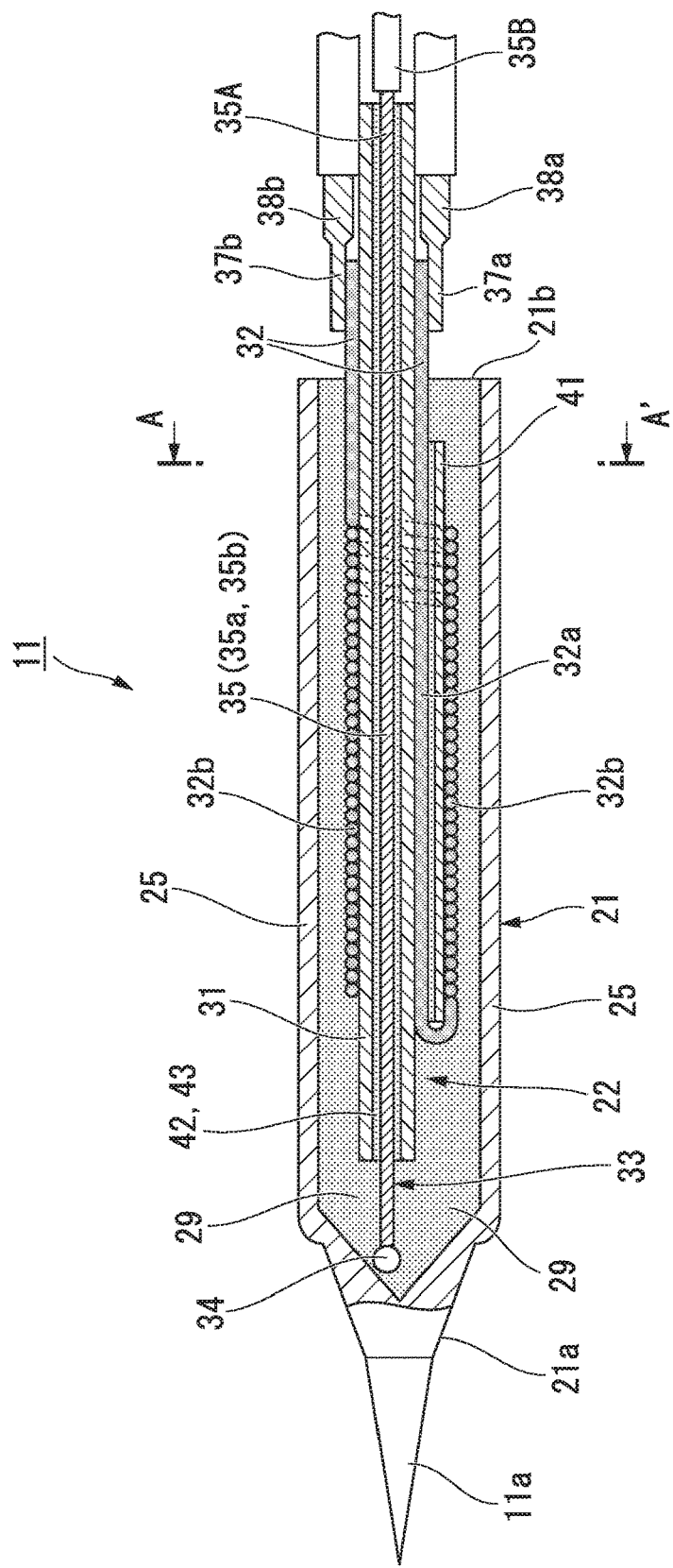
FIG. 2 is a cross sectional view showing an iron tip.
Figure 3:
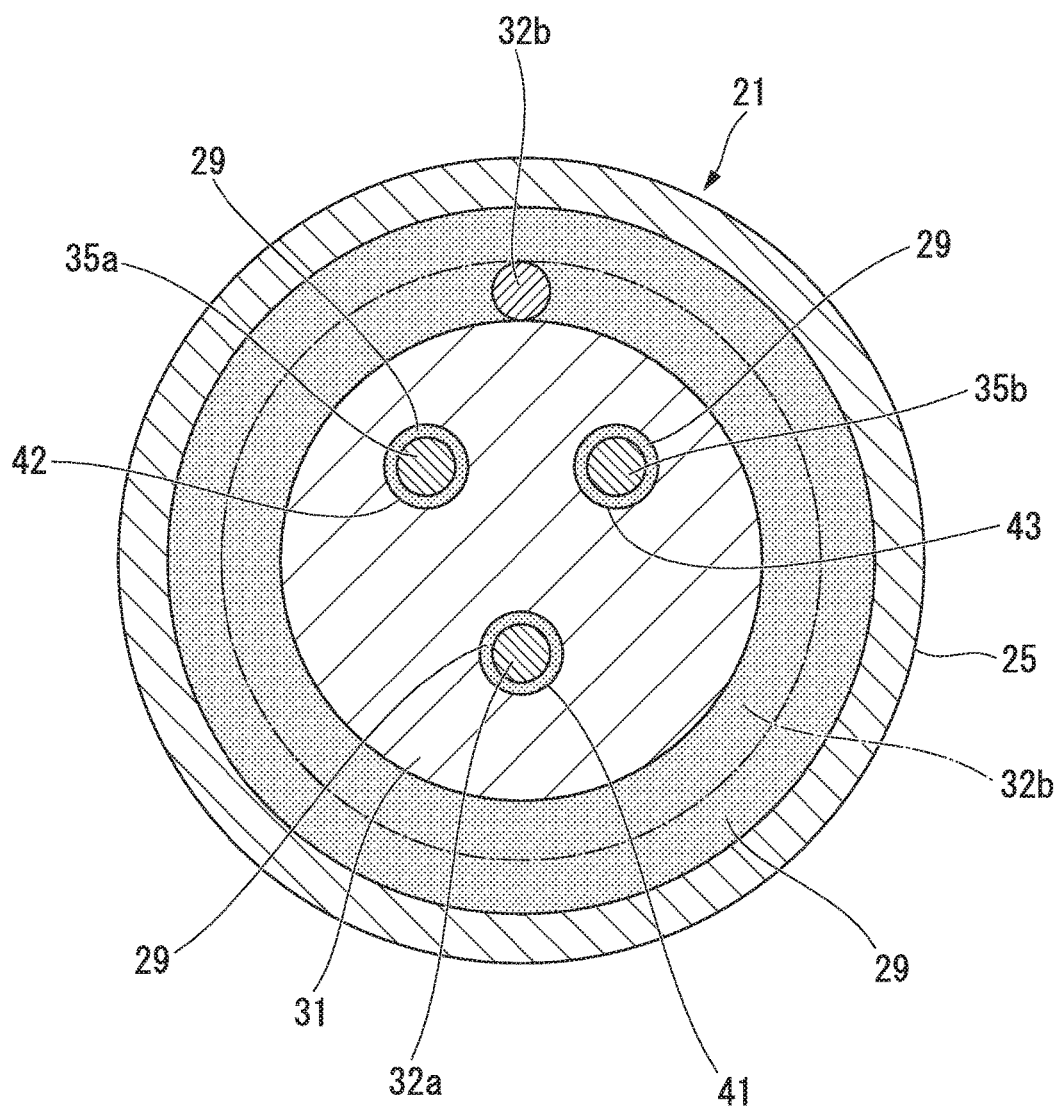
FIG. 3 is a cross sectional view seen along the line A-A' in FIG. 2.

FIG. 1 is an external perspective view of a soldering iron according to a first embodiment of the aspect of the present invention. FIG. 2 is a cross sectional view showing an iron tip. FIG. 3 is a cross sectional view seen along the line A-A' in FIG. 2.

A soldering iron 10 is used for such purposes as fusing (melting) solder which is low melting point alloy at a leading end 11a of the soldering iron 10, soldering and removing solder which is applied. The soldering iron 10 includes an iron tip 11 configured to fuse solder with the leading end 11a and an iron main body 12 provided integrally with the iron tip 11 at a base end 11b side of the iron tip 11.

At a base end 12b of the iron main body 12, a cord armor 13 formed of rubber is attached. In the cord armor 13, a cord 14 is formed to penetrate therein, which is connectable to power source. In the description hereinafter, simply describing "leading end" refers to an end of the member being referred to in the direction towards the leading end 11a of the iron tip 11, and simply describing "base end" refers to an end of the member being referred to in the direction towards the base end 12b of the iron main body 12.

As shown in FIG. 2, the iron tip 11 includes an iron tip main body 21, a heating device 22 built in the iron tip main body 21 and a grip part 23 (refer to FIG. 1) provided so as to cover a vicinity of a base end 21b at an opposite side to a leading end 21a of the iron tip main body 21.

The iron tip main body 21 includes an exterior body 25, inside of which is hollow, and the heating device 22 inserted inside the exterior body 25. And a leading end of the exterior body 25 is made to be the leading end 11a of the iron tip 11.

In the present embodiment, the exterior body 25 is formed of iron. However, the exterior body 25 can be made of stainless alloy, copper, copper alloy, silver, silver alloy or the like. In a gap between the exterior body 25 and the heating device 22, a filling member 29 of insulator with high heat conductivity, for example, ceramics is formed.

The heating device 22 has an insulator tube 31 of insulator material for example ceramics, a heater wire 32 configured to heat the iron tip main body 21 and a temperature sensor 33 configured to detect the temperature of an leading end side of the iron tip main body 21, which is the leading end 11a of the iron tip 11. The heater wire 32 includes an outward route part 32a extending towards the leading end of the iron tip 11a and also includes a return route part 32b extending towards the base end of the iron tip 11b, configured by folding back the outward route part 32a (the heater wire 32) at a vicinity of the leading end 11a of the iron tip 11. The outward route part 32a and the return route part 32b of the heater wire 32 include a continuous heating wire. As examples of the heating wire, there are iron-chromium alloy containing aluminum, tungsten line, nichrome wire or the like.

The outward route part 32a of the heater wire 32 is accommodated in a heater wire hole 41 formed in the insulator tube 31, which is described later. And the return route part 32b of the heater wire 32 is wound around an outer circumferential surface of the insulator tube 31. The outward route part 32a and the return route part 32b of the heater wire 32 are respectively connected to an electrical power wire 38a and an electrical power wire 38b via a contact piece 37a and a contact piece 37b at a side of the base end 21b of the iron tip main body 21. In this way, the heater wire 32 generates heat, being supplied power from the electrical power wire 38a and the electrical power wire 38b, and thus possible to heat the leading end 11a of the iron tip 11 via the filling member 29.

In addition, the heater wire 32 can be covered with an oxide film, for example, by burning a surface in order to enhance insulation quality. In this way, it is possible to enhance the layout density by disposing the heater wire and the sensor wire, or the sensor wires, closer with each other. Therefore, it is possible to use even smaller iron tip, which enhances heat efficiency due to higher density of the heater wires.

The temperature sensor 33 includes a temperature detection part 34 disposed at a side of a leading end of the insulator tube 31 and two sensor wires 35 extending from the temperature detection part 34. The temperature detection part 34 is disposed at a leading end side of the heating device 22. For example, K type thermocouple such as an alumel-chromel joined body, E type thermocouples such as a chromel-constantan joined body, J type thermocouples such as an iron-constantan joined body and those sensors that function equally as thermocouples can be used as the temperature detection part 34.

By forming the temperature detection part 34 of the temperature sensor 33 so as to abut with an iron tip 11 (leading end 11a), it is possible to detect the temperature of the iron tip 11 (leading end 11a) even more accurately. In case where temperature sensor is configured in serial or parallel, the temperature detection part 34 is configured not to abut with the iron tip 11 (exterior body 25).

The sensor wires 35 include a conductive wire 35A and an insulating cover 35B covering the conductive wire 35A. Among the two sensor wires 35, one is configured to be a positive pole side sensor 35a and the other is configured to be a negative pole side sensor 35b. The positive pole side sensor 35a and the negative pole side sensor 35b are respectively accommodated in a first sensor wire hole 42 and a second sensor wire hole 43 (to be described below) formed in the insulator tube 31.

Figure 4:
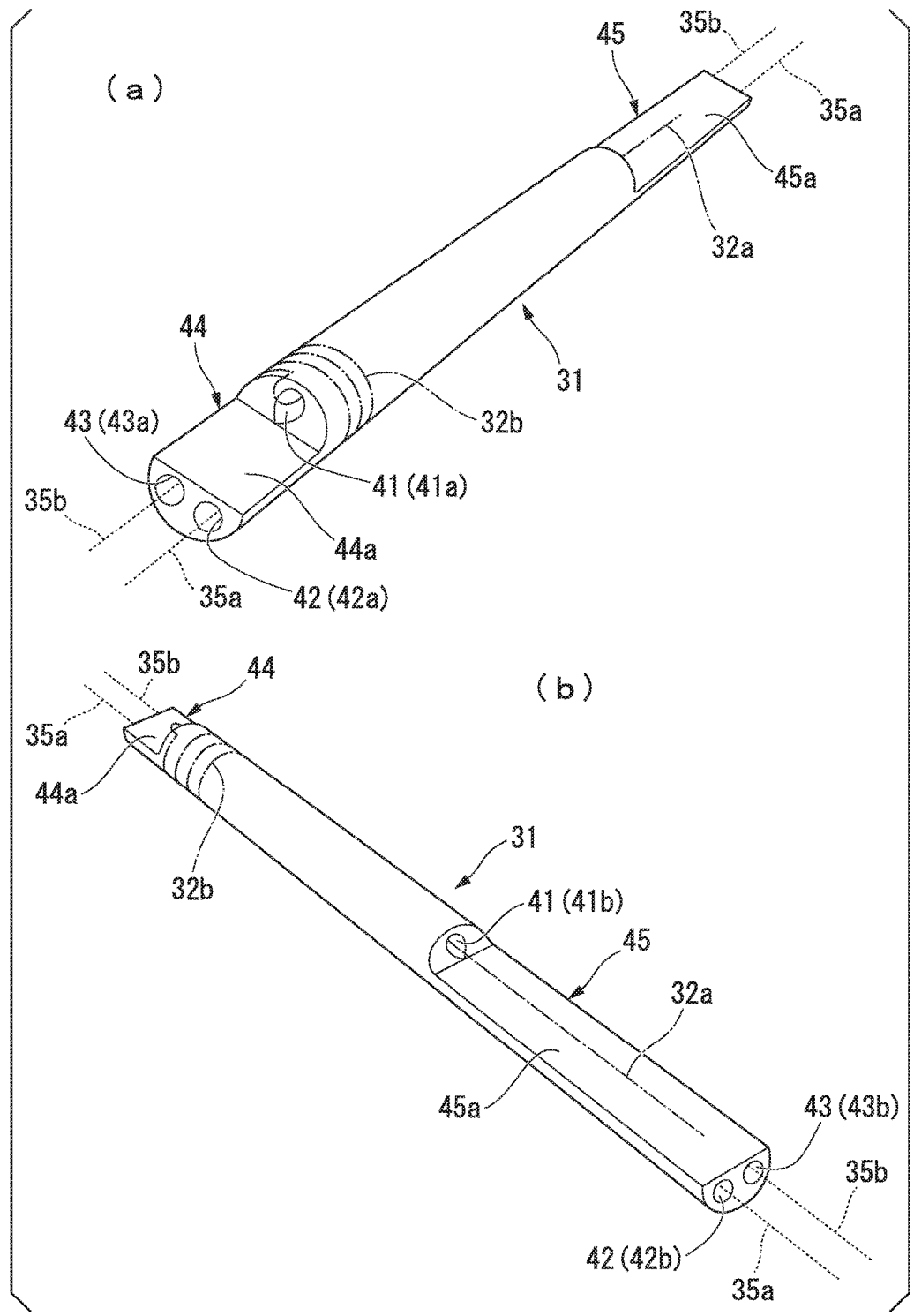
FIG. 4 is a perspective view showing an insulator tube.

FIG. 4 is a perspective view showing an insulator tube. And FIG. 4 (a) is an external perspective view of an insulator tube seen from a leading end side. FIG. 4 (b) is an external perspective view of an insulator tube seen from a base end side.

The insulator tube 31 is a cylindrical member, for example, a full body of which is formed of ceramics. In the insulator tube 31, there are three holes are formed, the heater wire hole 41 extending along the longitudinal direction of the insulator tube 31, the first sensor wire hole 42 and the second sensor wire hole 43. Among these holes, the outward route part 32a of the heater wire 32 is accommodated in the heater wire hole 41. And the positive pole side sensor 35a is accommodated in the first sensor wire hole 42, and the negative pole side sensor 35b is accommodated in the second sensor wire hole 43.

At a leading side 31a (one side) and a base end side 31b (the other side) of the insulator tube 31, a notch part 44 and a notch part 45 are formed respectively. Each of the notch part 44 and the notch part 45 are formed in a shape in which an approximately cylindrical member is cut off about a half in the diameter direction and a cross section orthogonal to the longitudinal direction is semicircle. And a flat surface 44*a* and a flat surface 45*a* are formed on the notch part 44 and the notch part 45 respectively.

The heater wire hole 41 of the insulator tube 31 has an opening 41*a* and an opening 42*b* formed at the notch part 44 and at the notch part 45 respectively. Also, the first sensor wire hole 42 and the second sensor wire hole 43 has an opening 42*a*, an opening 42*b*, an opening 43*a* and an opening 43*b* respectively at the leading side 31*a* (one side) and the base end side 31*b* (the other side) of the insulator tube 31. (The first sensor wire hole 42 has the opening 42*a* and the opening 42*b*, and the second sensor wire hole 43 has the opening 43*a* and the opening 43*b*.) That is to say, a hole length in full of the heater wire hole 41 is shorter than those of the first sensor wire hole 42 and the second sensor wire hole 43. And, the heater wire 32 is exposed on the flat surface 44*a* of the notch part 44 and on the flat surface 45*a* of the notch part 45.

Figure 5:
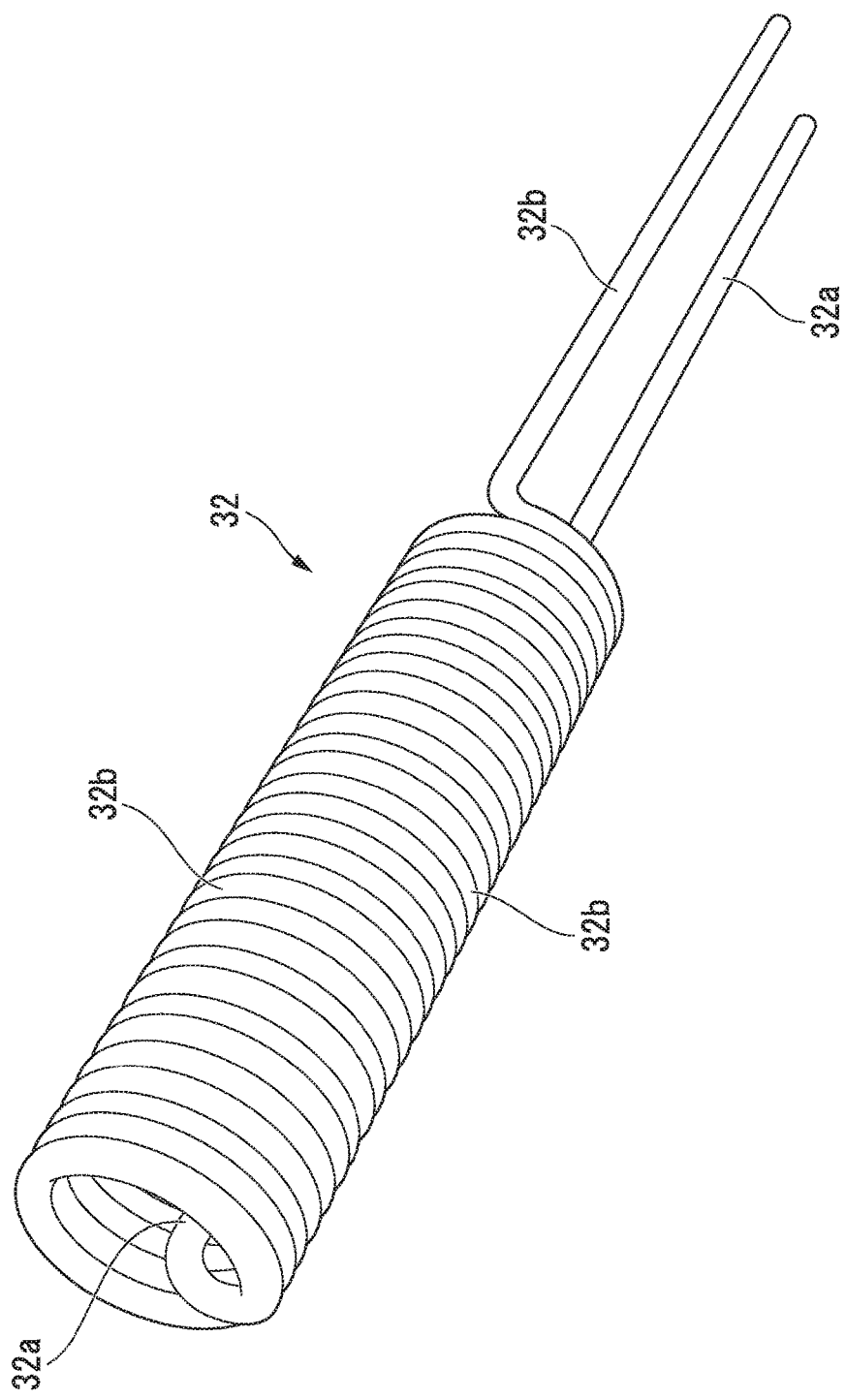
FIG. 5 is a perspective view showing a heater wire.

Around the outer circumferential surface of the insulator tube 31 in an area between the notch part 44 and the notch part 45 where the cross section of the insulator tube 31 is a circle, the return route part 32*b* of the heater wire 32 is wound like a coil. In addition, FIG. 5 shows an external perspective view of the heater wire 32 only.

Hereinafter, functions and effects of the soldering iron 10 of the above configuration will be described. The soldering iron 10 of the aspect of the present invention is provided with the insulator tube 31 of insulator inside the exterior body 25, with which the iron tip main body 21 is configured, and three holes (wiring holes), the heater wire hole 41, the first sensor wire hole 42 and the second sensor wire hole 43 are formed in the insulator tube 31. And, the heater wire hole 41 of the insulator tube 31 accommodates the outward route part 32*a* of the heater wire 32, the first sensor wire hole 42 accommodates the positive pole side sensor 35*a*, and the second sensor wire hole 43 accommodates the negative pole side sensor 35*b*. In the configuration as above, it is possible to reduce diameter of the iron tip 11 of the soldering iron 10. For example, it is possible to make an outer diameter of the iron tip main body 21 of the soldering iron 10 of the aspect of the present invention less than 5 mm.

That is to say, in the configuration of the double tube configuration of the cylindrical member for winding the heater wire around its outer circumferential surface and the cylindrical member for protecting the sensor wire of the temperature sensor as in the related art, reduction of diameter of the iron tip is limited. In the aspect of the present invention of a single tube configuration by winding the heater wire 32 around the outer circumferential surface of the insulator tube 31 and by leading two sensor wires 35*a* and 35*b* of the temperature sensor 33 through inside the insulator tube 31, drastic reduction of diameter of the iron tip is possible. Thus, in the surface mount structures in which extremely small LSIs or the like densely disposed, it is possible to easily solder extremely small soldering spots without interference of the iron tip 11 in surroundings of the soldering spot.

In addition, by leading the two sensor wires 35*a* and 35*b* respectively through the first sensor wire hole 42 and the second sensor wire hole 43 formed in the insulator tube 31 made of ceramics or the like, it is possible to securely insulate these sensor wires 35*a* and 35*b* with the heat wire 32 even in a state of high temperature when the heater wire 32 is energized.

In addition, the notch part 44 is formed at the leading side 31*a* (one side) of the insulator tube 31, and the opening 41*a* of the heater wire hole 41 is provided at the notch part 44. In this way, it is possible to stably maintain a spacing distance between the temperature detection part 34 of the temperature sensor 33 and a leading end side of the heater wire 32.

In addition, the notch part 45 is formed at the base end side 31*b* (the other side) of the insulator tube 31, and the opening 41*b* of the heater wire hole 41 is provided at the notch part 45. Accordingly, it is possible to maintain a long spacing distance between exposed portions of the positive pole side sensor 35*a*, the negative pole side sensor 35*b* and etc. of the temperature sensor 33 pulled out of an end surface of the base end side 31*b* (the other side) of the insulator tube 31 and a base end side of the heater wire 32. In this way, it is possible to securely ensure the insulation quality between the heater wire 32 and the positive pole side sensor 35*a*, the negative pole side sensor 35*b* and etc. of the temperature sensor 33 at the base end 21*b* of the iron tip main body 21.

Further, the notch part 45 provided with the flat surface 45*a* is formed at the base end side 31*b* (the other side) of the insulator tube 31, and accordingly it is possible to securely ensure the insulation quality between the return route part 32*b* wound by the heater wire 32 and the outward route part 32*a* of the heater wire 32.

Additionally, the notch part (the notch part 44, the notch part 45) may be formed at least either one of the one side and the other side in the longitudinal direction of the insulator tube (the insulator tube 31). That is to say, the insulator tube is good as far as the notch part is formed at least either one of the one side and the other side in the longitudinal direction of the insulator. Also, the notch part may be provided with the flat surface (the flat surface 44*a*, the flat surface 45*a*) being spread along the longitudinal direction. And one of the openings (the opening 41*a*, the opening 41*b*) of the heater wire hole (the heater wire hole 41) may be formed at the notch part.

(Second Embodiment)

Figure 6:
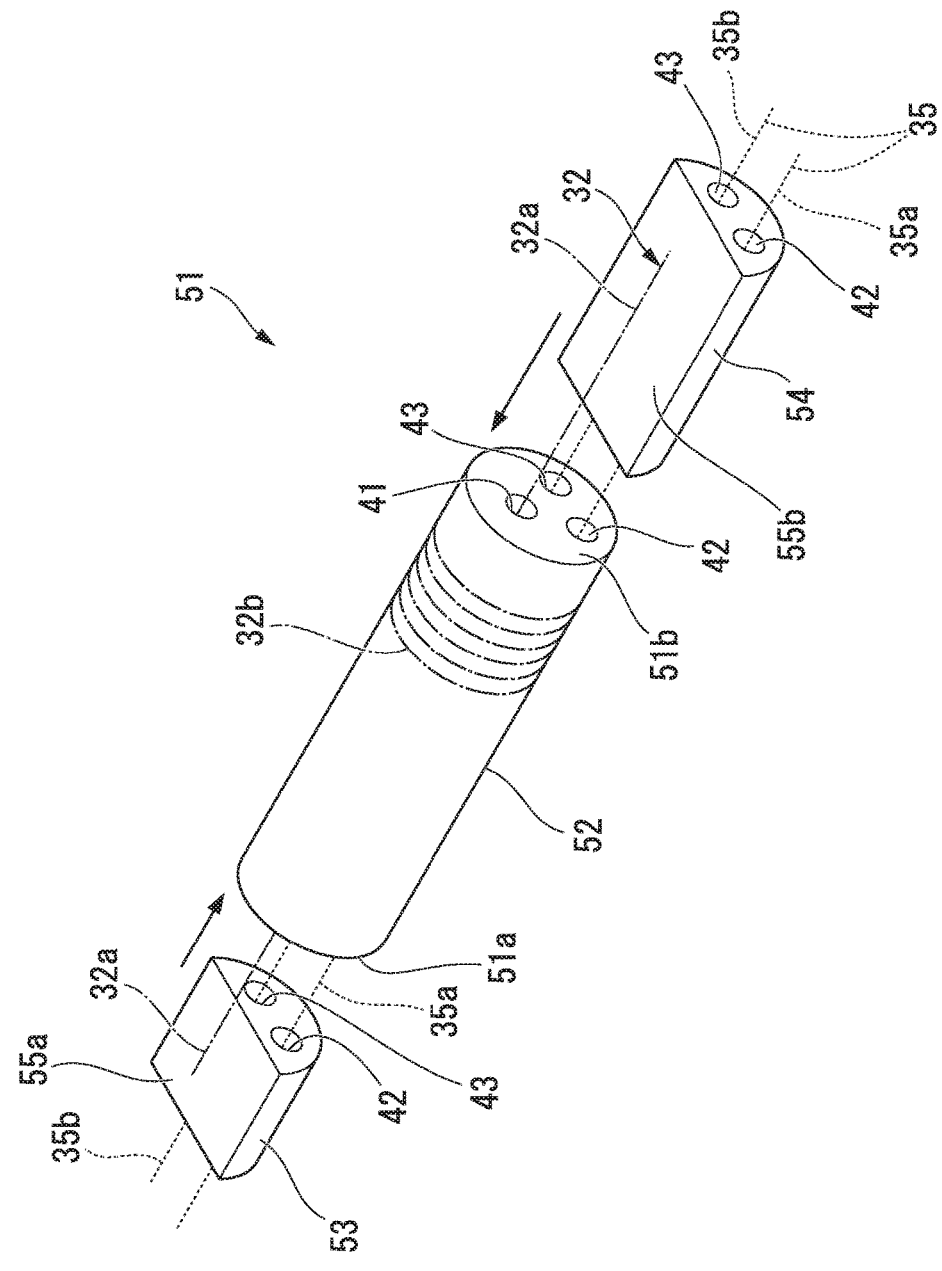
FIG. 6 is a perspective view of an insulator tube according to a second embodiment of the aspect of the present invention.

FIG. 6 is a perspective view showing a figure of an insulator tube according to a second embodiment of the aspect of the present invention. A configuration of the same sort as one in the first embodiment is referred to by the same reference numeral, and a part of which is omitted in the drawings (refer to FIG. 2).

In the present embodiment, an area of the notch part (an area corresponding to the notch part) of the insulator tube is made by a separated member. That is to say, an insulator tube 51 of the second embodiment includes an insulator tube main body part 52 of approximately circle cross section, wound by the heater wire 32 around its outer circumferential surface, and an insulator tube auxiliary part 53 and as an insulator tube auxiliary part 54 disposed adjacent to the leading end side (one side) 51*a* and to the base end side (the other side) 51*b* of the insulator tube main body part 52 respectively.

In the insulator tube main body part 52, the heater wire hole 41 is formed to accommodate the outward route part 32*a* of the heater wire 32. And also in the insulator tube main body part 52, the first sensor wire hole 42 and the second sensor wire hole 43 are formed to respectively accommodate the positive pole side sensor 35*a* and the negative pole side sensor 35*b* of the temperature sensor 33.

The insulator tube auxiliary part 53 and the insulator tube auxiliary part 54 are configured to have a smaller cross sectional diameter (a smaller cross section, a smaller cross sectional area) than that of the insulator main body part 52, for example, to have a cross section of approximately semicircle. And, each of the insulator tube auxiliary part 53 and the insulator tube auxiliary part 54 are provided with a flat surface 55*a* and a flat surface 55*b* respectively. And in each of the insulator tube auxiliary part 53 and the insulator tube auxiliary part 54 respectively, the first sensor wire hole 42 and the second sensor wire hole 43 are formed to accommodate the positive pole side sensor 35a and the negative pole side sensor 35b of the temperature sensor 33 respectively (The first sensor wire hole 42 accommodates the positive pole side sensor 35a and the second sensor wire hole 43 accommodates the negative pole side sensor 35b.). Accordingly, the area of the insulator tube corresponding to the notch part of the first embodiment is made by the separated members as the insulator tube auxiliary part 53 and the insulator tube auxiliary part 54 from the insulator tube main body part 52. In this way, it is possible to easily manufacture the insulator tube 51 compared to the case of forming the notch part.

In addition, it is also possible to configure the insulator tube auxiliary part 53 and the insulator tube auxiliary part 54 by combining even smaller areas which are further divided.

(Third Embodiment)

Figure 7:
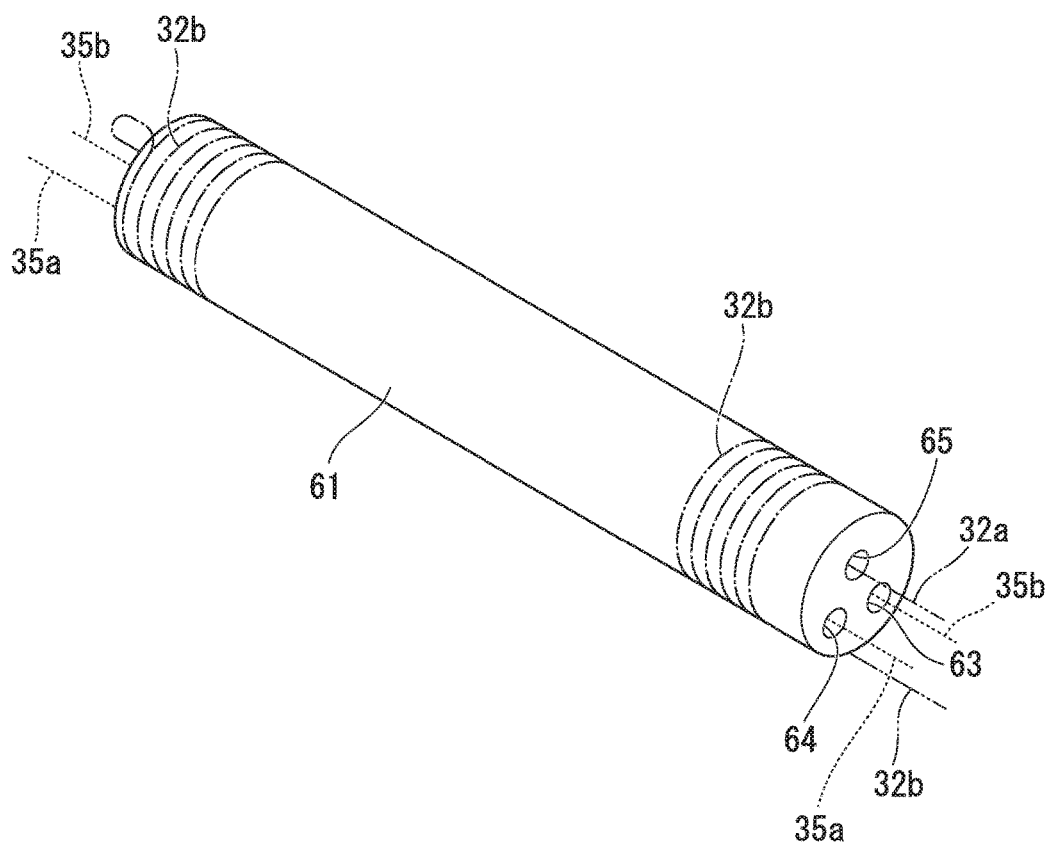
FIG. 7 is a perspective view of an insulator tube according to a third embodiment of the aspect of the present invention.

FIG. 7 is a perspective view showing a figure of an insulator tube according to a third embodiment of the aspect of the present invention. A configuration of the same sort as one in the first embodiment is referred to by the same reference numeral, and a part of which is omitted in the drawings (refer to FIG. 2).

In the present embodiment, the notch part of the insulator tube is omitted and an outer shape of an insulator tube 61 is made to be a uniform cylindrical tube. That is to say, the insulator 61 of the third embodiment has an approximately circle cross section, and the heat wire 32 is wound around an outer circumference of the insulator tube 61 like a coil.

In the insulator tube 61, the heater wire hole 63 is formed to accommodate the outward route part 32a of the heater wire 32. And also in the insulator tube 61, the first sensor wire hole 64 and the second sensor wire hole 65 are formed to respectively accommodate the positive pole side sensor 35a and the negative pole side sensor 35b of the temperature sensor 33.

In this way, by making the insulator tube 61 having a cross section of approximate circle uniformly from an leading end side to a base end side, it is possible to easily manufacture the insulator tube and reduce the manufacturing cost of the soldering iron.

The embodiments of the aspect of the present invention is described above, however, the embodiments are presented for exemplary purpose, and not intended to limit the scope of the invention. It is possible to work the embodiments in other variety of modes, and possible to conduct various omission, replacement and changes without departing from the scope of the invention. The embodiments and its modifications fall within the scope and the main point of the invention, and also fall within the scope of the claimed inventions and its equivalents.

For example, in the embodiments, the first sensor wire hole 42 and the second sensor wire hole 43 to independently accommodate the positive pole side sensor 35a and the negative pole side sensor 35b of the temperature 33 are formed. However, it is possible to form a single hole (for example, a hole of oval cross section) to accommodate the positive pole side and negative pole side sensor wires together. In this way, it is possible to further reduce a number of holes (for example, two) to form in the insulator tube, and possible to further reduce diameter of the iron tip. Also, it is possible to form 4 or more holes in the insulator tube.

Other than above embodiments, the soldering iron described above may be applicable to, for example, soldering tweezers (a soldering iron) for putting on and off of electrical components, which are provided with two openable iron tips from each other. In this way, it is possible to realize soldering tweezers for putting on and off electrical components, which are possible to grasp and remove tiny electrical components.

The invention claimed is:

1. A soldering iron comprising:
   an iron main body; and
   an iron tip having a leading end configured to fuse solder, the iron tip comprising:
      an iron tip main body having a hollow space inside extending along a longitudinal direction;
      an insulator tube accommodated in the hollow space;
      a heater wire configured to heat the iron tip main body, and
      a temperature sensor having a temperature detector and a sensor wire and configured to detect a temperature of the leading end side of the iron tip,
   wherein the heater wire includes:
      an outward route part extending towards the leading end of the iron tip,
      a return route part extending towards a base end of the iron tip and being wound like a coil around an outer circumferential surface of the insulator tube, and
      a folding back part arranged in the hollow space at a vicinity of the leading end of the iron tip and folded back between the outward route part and the return route part,
   wherein the insulator tube has a heater wire hole configured to accommodate the return route part of the heater wire and a sensor wire hole configured to accommodate the sensor wire, the heater wire hole and the sensor wire hole being independent of each other,
   the return route part of the heater wire is wound directly around the outer circumferential surface of the insulator tube having both the heater wire hole and the sensor wire hole,
   the wound return route part of the heater wire is arranged around the outward route part of the heater wire, and
   a wall of the insulator tube is disposed between the outward route part of the heater wire and the wound return route part of the heater wire.

2. The soldering iron according to claim 1, wherein the sensor wire hole comprises a first sensor wire hole configured to accommodate a positive pole side sensor wire of the temperature sensor and a second sensor wire hole configured to accommodate a negative pole side sensor wire of the temperature sensor.

3. The soldering iron according to claim 1 or 2, wherein the insulator tube includes:
   an insulator tube main body part, around the outer circumferential surface of which is wound the heater wire, and
   an insulator tube auxiliary part disposed adjacent to at least either one of one end side and the other end side of the insulator tube main body part, having a smaller cross sectional diameter than the insulator tube main body part and the sensor wire hole formed thereon.

4. The soldering iron according to claim 1, wherein an outer diameter of the iron tip main body is less than 5 mm.

5. The soldering iron according to claim 1, wherein the insulator tube is made of ceramics.

6. A soldering iron comprising:
   an iron main body; and
   an iron tip having a leading end configured to fuse solder, the iron tip comprising:

an iron tip main body having a hollow space inside extending along a longitudinal direction;
a ceramic member made of ceramics and accommodated in the hollow space;
a heater wire configured to heat the iron tip main body, and
a temperature sensor having a temperature detector and a sensor wire and configured to detect a temperature of the leading end side of the iron tip,
wherein the heater wire includes:
an outward route part extending towards the leading end of the iron tip,
a return route part extending towards a base end of the iron tip, while the heater wire being disposed on and wound directly around an outer circumferential surface of the ceramic member, and
a folding back part arranged in the hollow space at a vicinity of the leading end of the iron tip and folded back between the outward route part and the return route part, wherein the ceramic member has a heater wire hole configured to accommodate the return route part of the heater wire and a sensor wire hole configured to accommodate the sensor wire, the heater wire hole and the sensor wire hole being independent of each other,
the wound return route part of the heater wire is arranged around the outward route part of the heater wire, and
a wall of the insulator tube is disposed between the outward route part of the heater wire and the wound return route part of the heater wire.

7. The soldering iron according to claim 6, wherein:
a distance in the longitudinal direction is provided between the temperature detector and the folding back part of the heater wire, and
the distance between the temperature detector and the folding back part of the heater wire is greater than an outer diameter of the ceramic member.

8. The soldering iron according to claim 6, wherein the ceramic member is a single member or a combination of several members.

* * * * *